Figure 1:
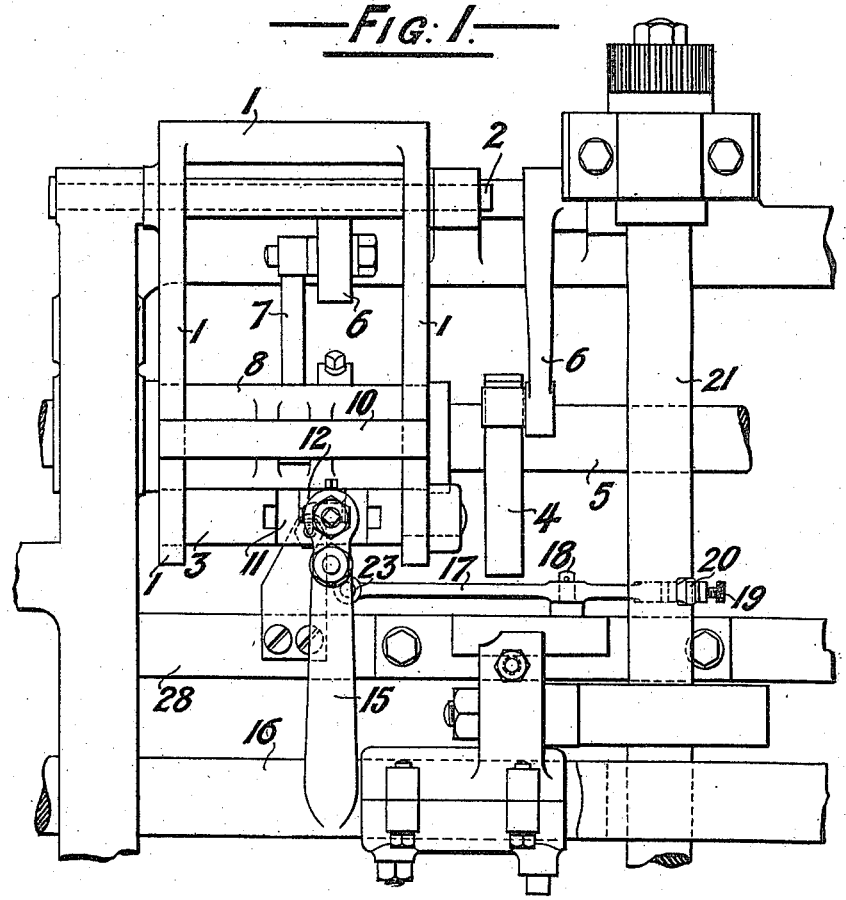

W. AVERY.
MACHINE FOR AUTOMATICALLY CUTTING OR FORMING SCREW THREADS UPON SCREWS.
APPLICATION FILED DEC. 17, 1909.

963,977.

Patented July 12, 1910.

3 SHEETS—SHEET 1.

W. AVERY.
MACHINE FOR AUTOMATICALLY CUTTING OR FORMING SCREW THREADS UPON SCREWS.
APPLICATION FILED DEC. 17, 1909.
963,977.
Patented July 12, 1910.
3 SHEETS—SHEET 2.
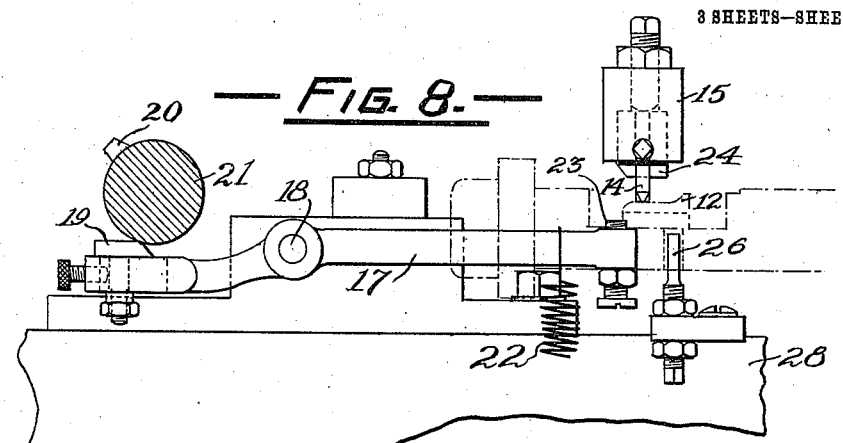
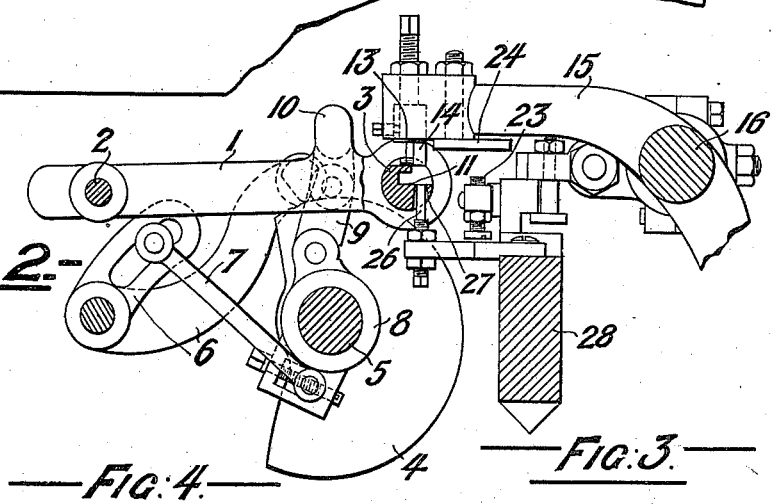
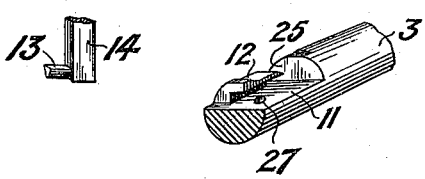
Witnesses.
Inventor.

W. AVERY.
MACHINE FOR AUTOMATICALLY CUTTING OR FORMING SCREW THREADS UPON SCREWS.
APPLICATION FILED DEC. 17, 1909.
963,977.
Patented July 12, 1910.
3 SHEETS—SHEET 3.
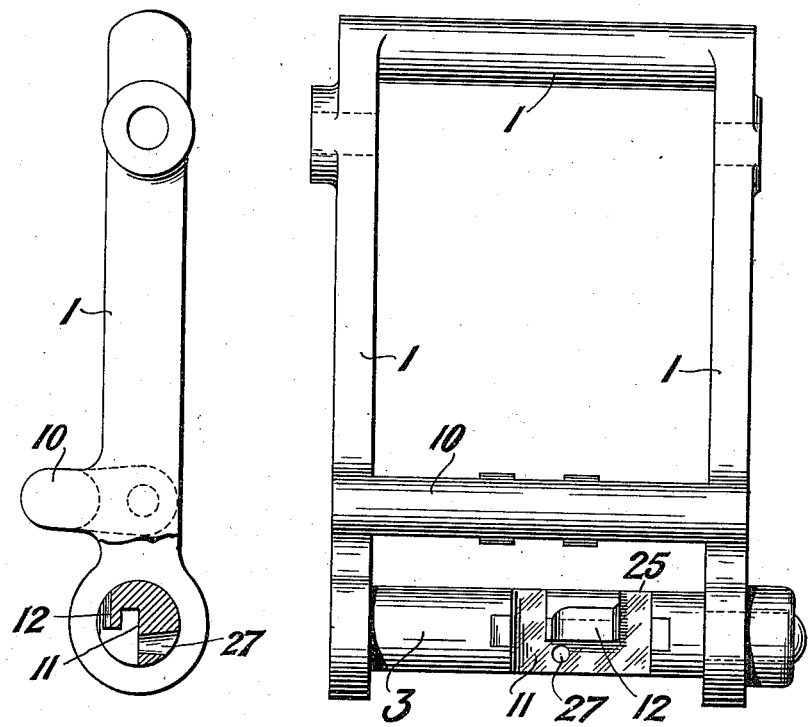
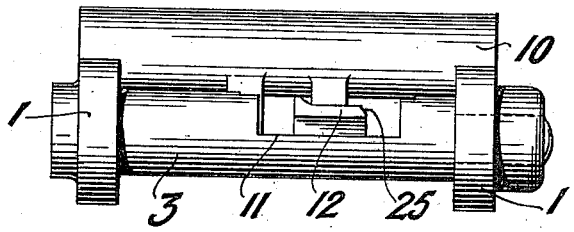

UNITED STATES PATENT OFFICE.

WILLIAM AVERY, OF RICHMOND, ENGLAND.

MACHINE FOR AUTOMATICALLY CUTTING OR FORMING SCREW-THREADS UPON SCREWS.

963,977.  Specification of Letters Patent.  Patented July 12, 1910.

Application filed December 17, 1909. Serial No. 533,584.

*To all whom it may concern:*

Be it known that I, WILLIAM AVERY, a subject of the King of Great Britain, residing at Richmond, in the county of Surrey, England, have invented a certain new and useful Improved Machine for Automatically Cutting or Forming Screw-Threads upon Screws, and of which the following is a specification.

In a prior specification forming part of my application for patent Serial No. 480451 filed on the 27th of February 1909 (Letters Patent No. 948200, dated February 1, 1910), I have described an improved machine for automatically cutting screw-threads upon screws, particularly such as wood screws which are tapered toward the point.

In the machine therein described the screw blank is carried by a horizontal rotating jaw-carrying spindle, and the cutting tool is carried by an arm from a longitudinal shaft which is capable of being rocked about its axis, and of also being slid endwise during the cutting operation.

The mechanism employed for rocking the tool-carrying shaft about its axis to advance the cutter to the work, comprised the employment of a regular cam of volute character, to which was communicated one revolution during the several traverse motions of the cutter necessary to complete the formation of the thread. This cam acted to vary the position of a first rocking member, which latter controlled the position of a second rocking member carrying a mold-bar, through the medium of which mold bar the angular position of the longitudinal shaft carrying the tool-carrying arm was controlled and regulated and means were provided for regulating the position of the second member carrying the mold bar, irrespective of the position of the first member. The first of these two members consisted of an outer frame rocking about an axle, and the position of this frame was governed by the volute cam before mentioned; this outer frame carried rocking tappet pieces which were controlled by other mechanism, and the said tappet pieces, during the cutting traverse of the tool, supported an inner rocking frame, which latter carried a mold bar; a stud carried by an arm extending from the tool-carrying shaft rested upon the mold-bar, which was shaped so that as the tool-carrying shaft was slid it received the necessary angular adjustment about its axis to produce the required shape of the core of the screw being manufactured; and then the tappet pieces were removed, the inner frame allowed to descend, the tool-carrying shaft was permitted to rock, and the tool was brought away from the screw while the retrograde motion of the cutter took place. Beyond this, certain trigger mechanism was employed in order to retain the tool-carrying shaft rigidly in a forward position during the feeding and pointing of the blank, and to this end a pivoted trigger was employed mounted on a slide which carried a back-die, the trigger being caused by mechanism described in the said specification, to engage with a projection on the sleeve of the tool-carrying shaft.

Now the object of the present invention is to simplify this mechanism, and to this end in order to control and regulate the movements of the cutting tool to and away from the work during its traverse motions, I provide a mold bar of peculiar construction, which is supported and given the requisite rising and falling movements through the medium of a rotary cam, a considerable portion of the periphery of which is of volute character, and which cam is revolved once during the whole of the traverse motions requisite to complete the formation of the thread upon the screw blank.

The mold bar which is peculiar to this invention, supports, above a flat surface with which it is formed, what I term a mold plate, which does not extend the full length of the flat surface formed upon the said bar, and a bearing stud carried by the arm extending from the tool-carrying shaft, travels, during the retrograde movement of the tool, on the flat surface of the mold bar.

A lifting member is employed actuated at proper times by a cam upon some moving part of the machine, which operates to lift the rearward extending arm of the tool shaft, so that upon the forward cutting motion, the stud carried by the tool arm will ride upon the mold plate at a higher level than the flat surface of the mold bar, and upon reaching the end of the mold plate, the stud will descend under the resilient torsional stress given to the tool shaft, and the stud will again execute its retrograde movement along the flat surface of the mold bar and again be lifted to the level of the mold plate previous to its forward traverse, and so on, the volute cam controlling the position of the mold bar, and gradually raising the same as the operation proceeds to increase the depth of cut of the cutting tool, both along the length of the shank and at the point thereof.

At the termination of the screw-cutting operation the mold bar is permitted, by the shape of the cam which governs its position, to descend to carry the cutting tool away from the work, and I provide a pin fixed to some stationary part of the machine, the upper end of which pin normally enters a vertical hole drilled through the mold bar and opening on to the flat surface thereof upon which the stud slides during its retrograde movement. When therefore the mold bar is permitted at the conclusion of the cutting operations to descend, the pin is caused to project through the said hole and above the said flat surface of the mold bar, and thereby becomes placed in the path of travel of the stud carried by the arm proceeding from the tool shaft, and this at a time when the stud is forward of the said pin, that is when the tool shaft is at the termination of its forward cutting movement; thus, so long as the pin projects through the hole of the bar, the tool-carrying shaft is retained in its forward position, and this to permit of the removal of the finished screw and the placing in position of the next blank to be operated upon, and the pointing of that blank.

The invention will readily be understood by reference to the accompanying drawings which illustrate those parts more particularly concerned with the present invention as applied to a machine of the type described in said prior specification.

Figure 1 shows, in plan view, a portion of a machine according to my aforesaid prior specification but constructed according to the present invention. Fig. 2 is a vertical transverse section of Fig. 1. Fig. 3 is a sectional perspective view of a portion of the mold bar detached. Fig. 4 is a perspective view of the stud at the end of the arm carried by the tool shaft and proceeding rearwardly therefrom. Fig. 5 is a plan view, detached, showing the rocking frame carrying the mold bar, and Fig. 6 is a side elevation, partly in vertical section, of the part shown by Fig. 5, Fig. 7 being a front elevation, projected from Fig. 5. Fig. 8 is a rear sectional elevation to show the member by which the arm proceeding from the tool shaft and carrying the stud is lifted to permit the stud to travel upon the mold plate.

According to the present invention, the rocking frame 1, shown detached by Figs. 5, 6 and 7, is free to rock upon a horizontal shaft 2 (Figs. 1 and 2) carried in the framework of the machine, and the said frame 1 is bifurcated and carries between the forward ends of its arms the mold bar 3, the said mold bar being capable of having rocking motion about its axis in the bearings formed in the forward ends of the said arms of the frame.

The rocking frame 1 is supported and given the requisite angular movement about the shaft 2 by means similar to those described in said prior specification forming part of my application for patent Serial No. 480451 (Letters Patent No. 948200), that is, by means of a cam 4 (Figs. 1 and 2) of somewhat volute character mounted upon the main cam shaft 5, said cam 4 operating through a rocking member comprising two lever arms 6 and a connecting rod 7 upon a sleeve 8 freely mounted on the shaft 5, to which sleeve is pivoted a toggle 9 one end of the toggle link being connected to said sleeve 8 and the opposite end to lugs proceeding from a bridge-piece 10 formed on the rocking frame 1, this movement being precisely similar to that of the machine described in said prior specification.

The mold bar 3 (Figs. 3, 5 6 and 7) is formed with a flat surface 11 above which there is supported a mold plate 12 which somewhat overhangs the flat surface 11, and it is upon the flat surface 11 or upon the mold plate 12 that there bears the foot 13 (Fig. 4) of a stud 14 carried by the arm 15, which is fixed or formed with the tool-carrying shaft 16 (Figs. 1 and 2) and by which the angular position of that shaft is governed, and thereby the tool is adjusted toward the work. The tool shaft 16 is fitted with a spring (not shown in the present drawings) which not only acts to move the shaft in its retrograde sliding motion, but also acts torsionally to carry the tool away from the work, and consequently to cause the foot of the stud 14 to bear upon the mold bar.

The member by which the arm 15 is lifted to carry the foot 13 of the stud 14 from the flat surface of the mold bar to the surface of the mold plate 12 at the commencement of the forward cutting movement of the tool shaft, is shown particularly in Figs. 1 and 8 as consisting of a lever 17 mounted upon a stationary fulcrum stud 18 upon some stationary part of the machine. One end of the lever 17 upon one side of the fulcrum 18 carries a rubbing surface 19, which is acted upon by a cam surface or by a tappet projection 20 fixed upon or carried by the fast motion cam shaft 21, which extends transversely across the machine.

The rubbing surface 19 is kept in contact with the shaft by means of a spring 22 (Fig. 8) and the forward end of the lever 17 is fitted with an adjustable stud 23, which stud is also shown in Fig. 2, and when the tappet 20 acts upon the lever 17, the stud 23 is brought up and contacts with a tappet plate 24 carried by the arm 15 (Fig. 2) and this motion is so timed that it occurs at the termination of the retrograde and inactive sliding movement of the cutting tool. By this action the foot 13 of the stud 14 (Fig. 4) is lifted, until at the next forward movement of the arm 15 it will rise up over the slightly rounded rear edge of the mold plate 12 on to the surface thereof, and this surface is suitably shaped to guide the cutting tool during its forward movement. The cutting traverse having been finished, the foot 13 of the stud 14 passes over the end of the mold plate 12 and drops on to the horizontal surface 11 of the mold bar. Then the retrograde movement of the tool shaft 16 takes place, and the foot 13 of the stud 14 travels along the horizontal flat surface 11 of the bar 3 to be again raised at the end of its travel to cause it to move forward on to the mold plate 12, and so on, the extreme end 25 of the mold plate on to which the foot of the stud is lifted, being preferably inclined or rounded so as to facilitate the passage of the said foot on to the said plate.

In order to hold forward the cutter shaft during the time of the withdrawal of the finished screw, the feeding of a new blank, and the pointing of the same, a stationary pin 26 is provided (Figs. 2 and 8) the same being carried from some stationary part of the framework of the machine, the said pin entering a hole 27 (Figs. 3, 5 and 6) formed vertically through the mold bar, said hole being so located, that when the frame 1 is allowed to descend by the shape of the cam 4 at the termination of the screw-cutting operation, the stationary pin 26 will project above the flat surface 11 of the mold bar, and this at a time when the foot 13 of the stud 14 carried by the arm 15, is forward of the said pin. Thereby, so long as the pin 26 is allowed to project through the hole 27 of the bar, the foot of the said stud 14 cannot pass rearwardly, and consequently the tool shaft 16 is held and retained in its forward position.

The hole 27 in the mold bar 3 through which the pin 26 passes, is preferably made somewhat conical as shown in Fig. 6 and fitting also somewhat loosely so that the mold bar can have the requisite small angular movements about its axis to cause its flat bearing surfaces to adjust themselves to the foot 13 of the stud 14.

I would have it understood that the pin 26 and the fulcrum pin 18 of the lever 17 can be fixed to any convenient part of the stationary framework of the machine. In the drawings, however, these two members are shown as being carried by a stationary bar 28 which corresponds to the slide 26 shown and described in my said patent application Serial No. 480451 Letters Patent No. 948200 but which according to the invention described in my application for patent of even date herewith (Serial No. 533583, filed 17 December 1909), can, if so desired, be dispensed with.

It will be obvious that instead of mounting the mold bar 3 in a frame rocking about a fulcrum, the said bar may well be carried in a frame capable of rising and falling in guides in a rectilinear direction.

What I claim as my invention and desire to secure by patent is:—

1. In a machine for automatically cutting screw threads upon screws, the combination with a shaft adapted to carry the cutter and to receive axial traverse movements and rocking movements to carry the cutter toward and away from the work, and having an arm to control its angular position, of a movable frame mechanism for progressively lifting said frame during the cutting operations upon a screw blank and for permitting said frame to descend at the termination thereof, a mold bar mounted in said frame, said frame having pivotal bearings to carry the ends of said mold bar to permit the latter to have rocking motions about its axis, said mold bar having a flat upper longitudinal surface and having an overhanging mold plate extending above said surface, said mold plate being of lesser length than said surface, and the upper surface of said mold plate being formed in accordance with the formation of the core of the screw being cut, a stud carried by said controlling arm extending from the cutter-carrying shaft to bear upon the flat surface of said mold bar during the retrograde traverse motions of the cutter-carrying shaft, and mechanism for lifting said arm of said cutter-carrying shaft from said flat surface of said mold bar to the surface of said overhanging mold plate at the commencement of each forward traverse motion of said cutter-carrying shaft to effect the cutting operation, said stud carried by said arm descending to the flat surface of said mold bar upon reaching the terminal end of said overhanging mold plate, to permit said cutter-carrying shaft to rock the cutter from the work preparatory to its retrograde motion.

2. In a machine for automatically cutting screw threads upon screws, the combination with a shaft adapted to carry the cutter and to receive axial traverse movements and rocking movements to carry said cutter toward and away from the work, and having an arm to control its angular position, of a horizontal shaft carried by the framework, a bifurcated rocking frame freely mounted on said shaft, mechanism for progressively lifting said frame during the cutting operations upon a screw blank and for permitting said frame to descend at the termination thereof, a mold bar located between the arms of said bifurcated frame said arms having pivotal bearings to carry the ends of said mold bar to permit the latter to have rocking motions about its axis, said mold bar having a flat upper longitudinal surface and having an overhanging mold plate extending above said surface, said mold plate being of lesser length than said surface, the upper surface of said mold plate being formed in accordance with the formation of the core of the screw being cut, and said mold bar having a hole extending through it from its under-surface to its upper flat surface transversely of the axis of said mold bar, a stud carried by said controlling arm extending from the cutter-carrying shaft to bear upon the flat surface of said mold bar during the retrograde traverse motions of the cutter-carrying shaft, and mechanism for lifting said arm of said cutter-carrying shaft from said flat surface of said mold bar to the surface of said overhanging mold plate at the commencement of each forward traverse motion of said cutter-carrying shaft to effect the cutting operation, said stud carried by said arm descending to the flat surface of said mold bar upon reaching the terminal end of said overhanging mold plate to permit said cutter-carrying shaft to rock said cutter from the work preparatory to its retrograde motion, a stationary upstanding pin carried from the framework located beneath the said hole formed through said mold bar carried by said bifurcated rocking frame, said pin being adapted to pass through said hole in said mold bar and project above its flat surface when said mold bar is lowered at the termination of the screw-cutting operation to retain said cutter-carrying shaft in its forward position during the feeding and pointing of the blank.

3. In a machine for automatically cutting screw threads upon screws, the combination with a shaft adapted to carry the cutter and to receive axial traverse movements and rocking movements to carry the cutter toward and away from the work, and having an arm to control its angular position, of a horizontal shaft carried by the framework, a bifurcated rocking frame freely mounted on said shaft, mechanism for progressively lifting said frame during the cutting operations upon a screw blank and for permitting said frame to descend at the termination thereof, a mold bar located between the arms of said bifurcated frame, said arms having pivotal bearings to carry the ends of said mold bar to permit the latter to have rocking motions about its axis, said mold bar having a flat upper longitudinal surface and having an overhanging mold plate extending above said surface, said mold plate being of lesser length than said surface, and the upper surface of said mold plate being formed in accordance with the foundation of the core of the screw being cut, a stud carried by said controlling arm extending from the cutter-carrying shaft to bear upon the flat surface of said mold bar during the retrograde traverse motions of the cutter-carrying shaft, a two-armed lever fulcrumed on the framework, one arm extending beneath said controlling arm of said cutter-carrying shaft, a rotary shaft and a tappet carried thereby to act upon the other arm of said two-armed lever, and a spring to act on said two-armed lever to hold the same in engagement with said tappet carrying shaft to cause said lever to lift said arm of said cutter-carrying shaft from said flat surface of said mold bar to the surface of said overhanging mold plate at the commencement of each forward traverse motion of said cutter-carrying shaft to effect the cutting operation, said stud carried by said arm descending to the flat surface of said mold bar upon reaching the terminal end of said overhanging mold plate, to permit said cutter-carrying shaft to rock the cutter from the work preparatory to its retrograde motion.

In witness whereof I have hereunto set my hand in the presence of two witnesses.

WILLIAM AVERY.

Witnesses:
 ALFRED P. DEARLE,
 WILLIAM A. MARSHALL.